United States Patent [19]
Bottazzi et al.

[11] Patent Number: 5,864,400
[45] Date of Patent: Jan. 26, 1999

[54] METHOD OF AND DEVICE FOR MEASURING RETURN LOSSES IN OPTICAL FIBER COMPONENTS

[75] Inventors: Lorenzo Bottazzi, Voghera; Silvano Donati, Milan; Marc Sorel, Pavia; Tiziana Tambosso, Turin, all of Italy

[73] Assignee: Cselt - Centro Studi E Laboratori Telecommunicazioni S.P.A., Turin, Italy

[21] Appl. No.: 10,903

[22] Filed: Jan. 22, 1998

[30] Foreign Application Priority Data

Feb. 14, 1997 [IT] Italy .................. TO97A0126

[51] Int. Cl.⁶ .............. G01B 9/02; G01N 21/00
[52] U.S. Cl. ............ 356/345; 356/349; 356/73.1
[58] Field of Search ............. 356/345, 73.1, 356/349

[56] References Cited

U.S. PATENT DOCUMENTS 5,321,501  6/1994  Swanson et al. ............ 356/73.1
5,473,428  12/1995  Lee et al ................... 356/345

OTHER PUBLICATIONS

"Laser Diode Feedback Interferometer For Measurement of Displacements Without Ambiguity", Silvano Donati et al, IEEE Journal OF Quatum Electronics, vol. 31,No. 1, Jan. 1995, 7pages.

Primary Examiner—Frank G. Font
Assistant Examiner—Roy M. Punnoose
Attorney, Agent, or Firm—Herbert Dubno

[57] ABSTRACT

A method of and an apparatus for measuring return loss in an optical fiber component. Radiation of a predetermined wavelength, e.g. from a laser, is launched into an optical fiber component, preferably through an optical fiber having a polarization control loop and the radiation reflected and the direct radiation are subjected to phase modification. An amplitude of the frequency component of the detected signal at the frequency imposed by phase modulation is measured and is used as the basis for evaluating the return loss.

10 Claims, 2 Drawing Sheets

METHOD OF AND DEVICE FOR MEASURING RETURN LOSSES IN OPTICAL FIBER COMPONENTS

SPECIFICATION

1. Field of the Invention

The present invention relates to the characterization of optical fiber components and, more specifically, to a method and a device for the high sensitivity; measurement of the return losses of such components, i.e. for the measurement of the fraction of the power of a radiation launched into the component, which is sent back towards the source. The term "optical fiber component" as used herein denotes both all fiber components, or integrated optics or discrete optics components equipped with an optical fiber termination for insertion into an optical fiber signal transmission line

2. Background of the Invention

The measurement of return losses is widely used in the characterization of the performance of optical components for telecommunications and electro-optical instruments. In order to measure the return losses of such optical fiber components, different techniques are currently used. These techniques are based on optical interferometers or on pulsed sources. However the sensitivity of such devices is insufficient or the devices; are particularly complex and thus costly.

OBJECT OF THE INVENTION

The object of the invention is to provide a new measurement technique based on the re-injection into the laser cavity of the laser radiation which is reflected back from the optical fiber component under test, and on the coherent interaction, in the same cavity, of the reflected radiation with the oscillation field present in the cavity. In this way, all optical components external to the source and the related alignment procedures are eliminated, and a continuous wave laser diode can be used instead of a pulsed one.

SUMMARY OF THE INVENTION

In the method, a radiation of pre-determined wavelength is sent toward an optical fiber component under test, the fraction of radiation reflected by the optical fiber component is made to interact in the source with the radiation generated by the source itself, the radiation resulting from such interaction is detected and the electrical signal resulting from the detection is processed. The method further comprises the steps of: subjecting both the direct radiation and the reflected radiation to a phase modulation, such as to cause periodic variations of the optical path of the radiations, and, for the processing, of measuring the amplitude of a frequency component of said electrical signal at the frequency imposed by the phase modulation, such amplitude being linked to the value of the return losses through a factor which depends on said optical path variations, and deriving the value of the return losses by a comparison with the amplitude values of the electrical signal measured in a calibration phase Wherein the direct radiation and the reflected radiation are subjected to calibrated attenuations.

The injection of a return radiation back into the source that emitted the radiation itself has been already used inside interferometers in order to measure the displacement s of a target with respect to the source. An example of such use is disclosed for instance in the paper "Laser Diode Feedback Interferometer for Measurement of Displacements without Ambiguity", by S. Donati et al., IEEE Journal of Quantum Electronics, Vol. 31, No. 1, Jan. 1995. According to this paper, the oscillating wave perturbed by the back injection presents an amplitude modulation of the type $\alpha^{1/2}\cos 2ks$ and a frequency modulation of the type $\alpha^{1/2}\sin 2ks$, where $\alpha$ indicates the power fraction injected back into the cavity, $k=2\pi/\lambda$ is the wave number corresponding to wavelength $\lambda$ of the source. The condition for operation is that $\alpha$ be small (e.g. less than 1%). By knowing a and by letting s vary, amplitude variations $\cos 2ks$ and frequency variations $\sin 2ks$ are measured, and the desired displacement is derived therefrom. Such a technique, in addition to requiring complex equipment due to the need to detect both amplitude and frequency modulation, clearly cannot be used for the purposes of the invention, as it requires the knowledge of $\alpha$, which in the present case is instead the quantity to be measured.

The invention also provides a device to perform the method, comprising a source sending a radiation towards an optical fiber component under test and a photodiode, located on the side of the source opposite to that from which the radiation is sent towards the optical fiber component, to collect and detect a radiation resulting from the interaction between the radiation generated by the source and the radiation reflected by the optical fiber component, the photodiode being associated with means for processing an electrical signal resulting from the detection. The device also comprises a phase modulator inserted between the source and the optical fibre component under test to modulate in phase both the radiation sent towards the optical fiber component and the reflected one and to cause a periodic variation of the optical path of said radiations, and the means for processing said electrical signal are arranged to provide the amplitude value of a frequency component of the detected signal at the frequency imposed by the phase modulator.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
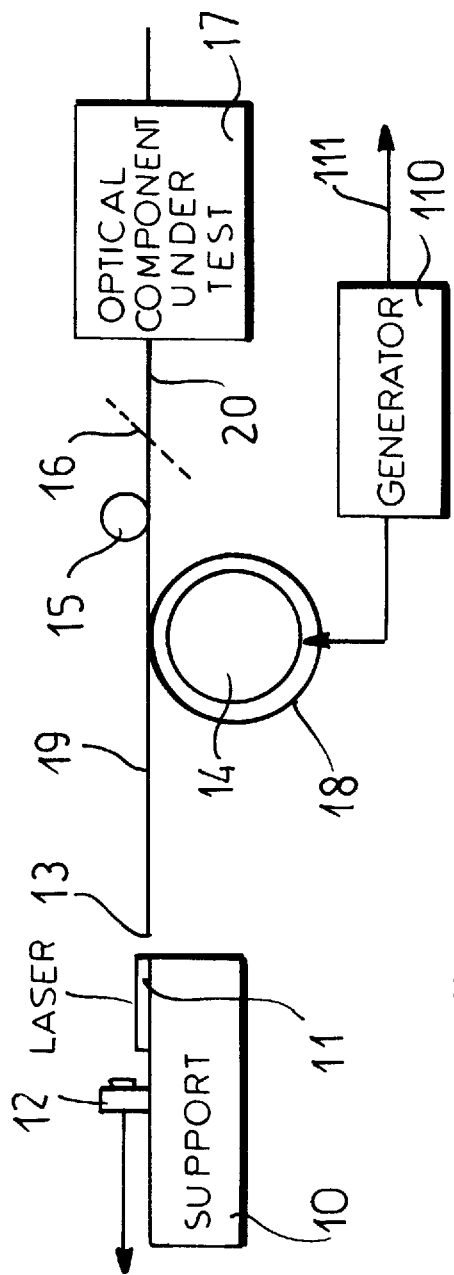
FIG. 1 is a diagram of the optical part of the device according to the invention.

As shown in FIG. 1, a radiation source 11 comprising a commercial single mode semiconductor laser of the Fabry-Perot or distributed reflector type sends a radiation of a wavelength $\lambda$ into a fiber length 19 through end face 13 subjected to anti-reflection treatment. A photodiode 12 is located behind laser 11, on support 10 thereof, and is arranged to detect the laser emission from the rear mirror.

For the measurement, sources with powers within a very wide range, e.g. 0.1–10 mW, are suitable. There are no specific constraints for the wavelength, either, and it is possible to employ for instance semiconductor lasers for wavelengths between 600 and 2900 nm. Clearly, in the case of measurements on optical telecommunications system components, the wavelengths to the employed are those typically used in such systems, for instance 850, 1300 and 1550, nanometers. Conversely, a limited line width is important, particularly a width less than 100 MHz, to guarantee an adequate time coherence.

Fiber length 19 is wound for 5–10 turns, as indicated in 18, onto a phase modulator 14 conveniently comprising a piezoceramic tube (e.g. of lead zirconate-titanate or the like). Piezoceramic modulators are well known in the art. Modulator 14 is driven by a generator 110 of saw-tooth or triangular ramp waveforms such as to induce by piezoelectric effect a periodic optical path variation ΔL of at least 20 times the wavelength. For the purposes of the invention, waveforms with a frequency ranging for instance between 10 Hz and 1 kHz are suitable. This phase modulation has the purpose of giving rise, at the output of photodiode 12, to a periodic signal which just allows distinguishing the effect due to the reflection by the optical fiber component from the effects due to reflections by the other optical components of the system, resulting in a d.c. signal. An additional single fiber turn 15 can be used to control the polarizaton state. Fiber length 19 ends with an angled surface 16, complementary to the shape of the end surface of a fiber length 20 for connection of fiber 19 to the device 17 under test. The connection is accomplished in conventional manner, by means of a physical contact connector or through a fusion splice. The angled termination aids in limiting the reflections at the interface between fiber lengths 19, 20, and thus in reducing the d.c. component in the signal detected by photodiode 12.

Figure 3:
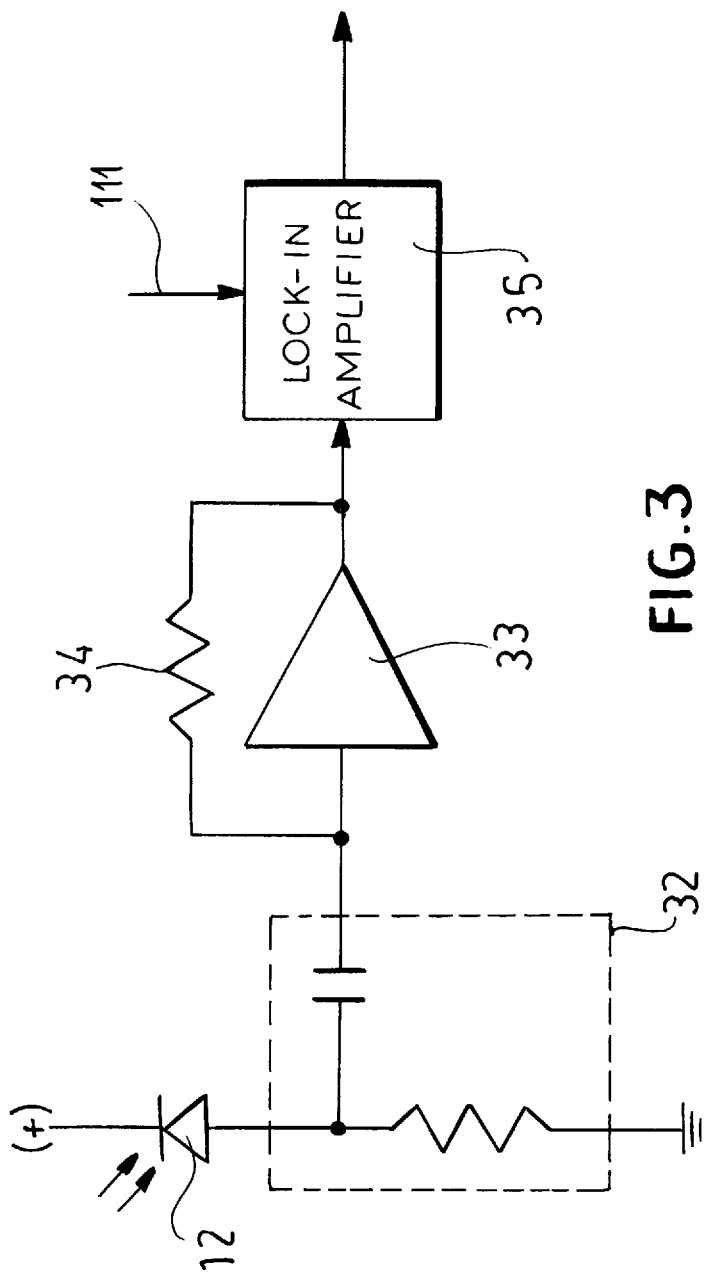
FIG. 3 is a diagram of the electronic circuits of the device according to the invention.

The units described form the optical measurement head. Photodiode 12 is associated with processing circuit (shown in FIG. 3) which allows obtaining the return loss α from the amplitude $\alpha^{1/2}\cos 2ks$ of the radiation detected by the photodiode itself. This amplitude, as stated previously, shall vary periodically at the frequency imposed by the phase modulator, given by $2\Delta L/\lambda T$, where ΔL is the optical path variation (clearly linked to s) introduced by the phase modulator during ramp period T and λ is the wavelength of the laser. In particular, an RC network 32 performs a low-pass filtering of the current generated by photodiode 12; RC network 32 is followed by an operational amplifier 33 which performs a transimpedance conversion and by a conventional lock-in amplifier 35 which performs the measurement of the amplitude of the electrical signal component at the frequency imposed by the phase modulator. Lock-in amplifier 35 receives as a reference the driving ramp of the phase modulator, provided by generator 110 (FIG. 1) through a connection 111. The value of α is obtained by comparison with the values plotted in a calibration curve obtained in an appropriate calibration phase.

Figure 2:
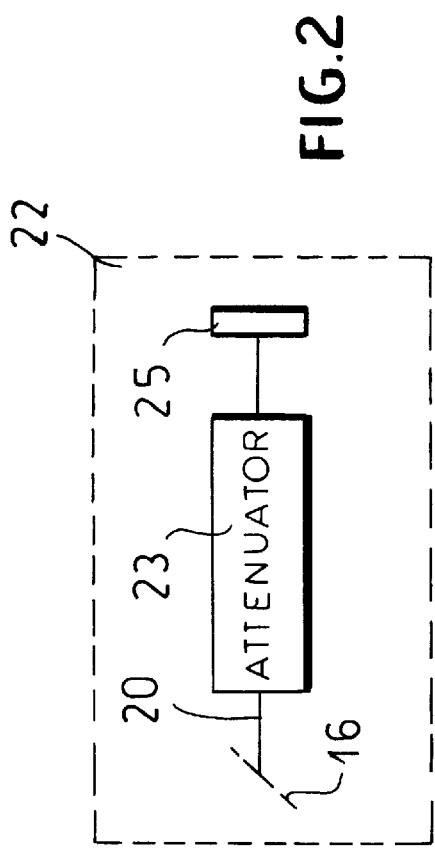
FIG. 2 shows the unit used for calibrating the device.

For the latter phase, calibration unit 22 shown in FIG. 2 is connected to fiber length 19 instead of optical fiber component 17 under test. The calibration unit contains a conventional calibrated attenuator 23, equipped with fiber terminations like that denoted by 20, and a mirror 25. This unit yields a return loss equal to $A^2R$, where A is the attenuation of calibrated attenuator 23 and R the reflectivity of mirror 25. The calibration curve is obtained by plotting the set attenuation values and the corresponding values of the output signal from the processing electronics associated with photodiode 12.

The instrument just described can measure the return losses at more than one wavelength, by simply using multiple laser diodes, one for each wavelength of interest.

The advantages of the present invention are, in addition to the already mentioned simplicity of the measurement head and to the low cost, intrinsic to the use of a commercial laser diode in back reflection operation:

absence of additional optics or of fast pulse modulation, such as those required in conventional instruments;

intrinsic self-alignment of the structure;

intrinsic immunity to external radiation since interaction process in the laser is coherent;

sensitivity suited for the application requirements and better than −70 dB.

Moreover, if the output side of optical fiber component 17 under test is also accessible, it will be possible to measure the insertion loss as well. This clearly requires a second photodiode, analogous with photodiode 12 and associated to processing electronics analogous to those described.

It is evident that what has been described is provided solely by way of non limiting example and that variations and modifications are possible without thereby departing from the scope of the invention. In particular, the components indicated above may be replaced by components performing the same functions.

We claim:

1. A method of measuring return losses in an optical fiber component, comprising the steps of sending a radiation of predetermined wavelength generated by a source into an optical fiber component in which return loss is to be measured;

a fraction of radiation reflected by the optical fiber component is caused to interact in the source with the radiation generated by the source itself;

the radiation resulting from the interaction is detected;

an electrical signal resulting from the detection is processed;

both the direct radiation and the reflected radiation are subjected to a phase modulation so as to cause periodic variations of the optical path of said radiations; and processing an electrical signal from detection of said interaction, wherein in said processing, an amplitude is measured of a frequency component of the detected signal at a frequency imposed by the phase modulation, such amplitude being linked to the value of said loses through a factor dependent upon said optical path variation, and the value of the return loss is derived by comparison with the amplitude values of said frequency component measured in a calibration phase wherein the reflected radiation and the direct radiation are subjected to calibrated attenuations.

2. The method defined in claim 1 wherein said phase modulation is obtained by piezoelectric effect.

3. The method defined in claim 1 wherein said phase modulation introduces an optical path variation whose maximum amplitude is not less than 20 times the wavelength of the radiation generated by the source.

4. The method as defined in claim 1 wherein, for the measurement of the amplitude of said frequency component, the detected signal is subjected to a low-pass filtering, the filtered signal is subjected to transimpedance conversion and the sought frequency component is selected through spectral analysis means, driven by a signal controlling the phase modulation.

5. A device for measuring return losses in an optical fiber component, comprising:

a source for sending a radiation towards an optical fiber component under test a photodiode, located on a side of the source opposite from a side thereof from which the radiation is sent towards the optical fiber component, to collect and detect a radiation resulting from the interaction between the radiation generated by the source and a fraction reflected by the optical fiber component, the photodiode being connected with means,for processing an electrical signal resulting from the detection, a phase modulator between the source and the optical fiber component under test to modulate in phase both the radiation sent towards the optical fiber component and the radiation reflected and to give rise to a periodic variation of the optical path of said radiations, the means for processing said electrical signal being arranged to provide an amplitude value of a frequency component of a detected signal at a frequency imposed by the phase modulator.

6. The device defined in claim 5 wherein the phase modulator is a piezoelectric modulator.

7. The device defined in claim 6 wherein the piezoelectric modulator comprises a piezoceramic tube onto which turns of a fiber length are wound, and arranged to introduce optical path variations not smaller than 20 times the wavelength of the radiation used for the measurement.

8. The device defined in claim 6 further comprising means for controlling a state of polarization of the radiation sent towards the optical fiber component and of the reflected radiation.

9. The device defined in claim 5 wherein the processing means comprise a low pass filter connected to the output of the photodiode, an operational amplifier connected to said filter for transimpedance conversion, and frequency analysis means connected to said operational amplifier and driven by the signal driving the phase modulator.

10. The device defined in claim 5 which comprises means for receiving the radiation transmitted by the optical fiber component under test, for the measurement of the insertion losses.

* * * * *